US007883219B2

(12) United States Patent
Jackson et al.

(10) Patent No.: US 7,883,219 B2
(45) Date of Patent: Feb. 8, 2011

(54) SYSTEM AND METHOD FOR DISPLAYING IMAGES

(75) Inventors: John David Jackson, Euless, TX (US); Steven Edward Smith, Coppell, TX (US); Duane Scott Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 936 days.

(21) Appl. No.: 11/645,866

(22) Filed: Dec. 27, 2006

(65) Prior Publication Data

US 2008/0158523 A1      Jul. 3, 2008

(51) Int. Cl.
*G03B 21/28* (2006.01)
*G03B 21/56* (2006.01)
*H04N 5/74* (2006.01)
*G02F 1/135* (2006.01)
*G02B 5/10* (2006.01)
*G02B 17/00* (2006.01)

(52) U.S. Cl. .............................. 353/98; 353/78; 353/51; 353/37; 348/758; 348/771; 349/30; 359/460; 359/864; 359/364

(58) Field of Classification Search .................. 353/98, 353/77–78, 50–51, 37; 348/758, 771; 349/30; 359/460, 864, 364
See application file for complete search history.

(56) References Cited

U.S. PATENT DOCUMENTS

| 6,908,199 | B2 * | 6/2005 | Cha ............................. 353/98 |
| 7,384,154 | B2 * | 6/2008 | Gohman et al. ............... 353/57 |
| 7,384,158 | B2 * | 6/2008 | Ramachandran et al. ...... 353/70 |
| 2007/0216877 | A1 * | 9/2007 | Sacre et al. .................... 353/97 |

OTHER PUBLICATIONS

Kuwata, M. et al., "70.3: Distinguished Contributed Paper: Wide Angle Projection Optics for Compact Rear Projector," SID Symposium Digest of Technical Papers, May 2005, pp. 1918-1921, vol. 36, Issue 1, Society for Information Display, San Jose, CA.

* cited by examiner

*Primary Examiner*—Georgia Y Epps
*Assistant Examiner*—Magda Cruz
(74) *Attorney, Agent, or Firm*—Charles A. Brill; Wade James Brady, III; Frederick J. Telecky, Jr.

(57) ABSTRACT

System and method for thin projection display systems. An embodiment comprises a light source, an array of light modulators optically coupled to the light source, a lensed mirror optically coupled to the array, and a controller electronically coupled to the array and to the light source. The array produces images on a display plane by modulating light from the light source based on image data and the controller provides light commands to the light source and load image data into the array. The lensed mirror reflects modulated light from the array onto the display plane, the lensed mirror comprising a refractive portion and a reflective portion. The refractive portion of the lensed mirror helps to increase the light bending capability to help reduce the overall thickness of a projection display system.

17 Claims, 3 Drawing Sheets

SYSTEM AND METHOD FOR DISPLAYING IMAGES

TECHNICAL FIELD

The present invention relates generally to a system and method for displaying images, and more particularly to a system and method for thin projection display systems.

BACKGROUND

Projection display systems provide a low-cost, high-performance alternative to expensive thin flat screen display systems, such as plasma and LCD direct view display systems. A projection display system with approximately the same screen size as a flat screen display system may cost a significant amount of money less than the flat screen display system. As the screen size increases, the cost advantage also increases. Furthermore, projection display systems may have optical advantages over flat screen display systems, such as a superior contrast ratio, smoother images, less visible picture elements, and so forth.

However, an advantage of flat screen display systems is their thinness (shallow cabinet depth). A flat screen display system may be as thin as a few inches, while a projection display system's cabinet may be several times thicker. Many consumers may select a flat screen display system over a projection display system, ignoring the projection display system's sometimes significant advantages, based solely on the flat screen display system's thinner profile and its ability to be mounted onto a vertical surface.

In a projection display system, such as a DMD-based projection display system, light from a light source is projected onto an array of light modulators (the DMD), which can, based on image data of an image being displayed, reflect the light away from or onto a display plane. Other micro-display technologies may modulate a light passing through the array of light modulators.

In order to produce an image of desired size, the modulated light in a projection display system must travel a predetermined distance in order to disperse sufficiently to create the properly sized image. The distance that the modulated light must travel may be a function of the optical characteristics of the optical system of the projection display system, such as the focal length of the lenses, desired image size, and so forth. Typically, the greater the distance that the modulated light must travel, the greater the cabinet depth.

SUMMARY OF THE INVENTION

These and other problems are generally solved or circumvented, and technical advantages are generally achieved, by embodiments of the present invention which provide a system and a method for thin projection display systems.

In accordance with an embodiment, a display system is provided. The display system includes a light source, an array of light modulators optically coupled to the light source and position in a light path of the light source, a lensed mirror optically coupled to the array of light modulators and positioned in the light path of the light source between the array of spatial light modulators and a display plane, and a controller electronically coupled to the array of light modulators and to the light source. The light source produces multiple colors of light, and the array of light modulators produces images on the display plane by modulating light from the light source based on image data. The lensed mirror reflects modulated light from the array of light modulators onto the display plane, and is comprised of a refractive portion and a reflective portion. The controller provides light commands to the light source and loads image data into the array of light modulators.

A method of manufacturing a display system is provided. The method includes installing a light source to generate multiple colors of light, installing a spatial light modulator in the light path of the multiple colors of light, installing a light direction unit in the light path of the multiple colors of light between the spatial light modulator and a display plane, and installing a controller to control the light source and the spatial light modulator. The light direction unit comprises a lensed mirror to direct light onto the display plane.

In accordance with another embodiment, a display system is provided. The display system includes a light source, an array of light modulators optically coupled to the light source and positioned in a light path of the light source, a catadioptric system optically coupled to the array of light modulators and positioned in the light path of the light source between the array of light modulators and a display plane, and a controller electronically coupled to the array of light modulators and to the light source. The light source produces multiple colors of light, the array of light modulators produces images on the display plane by modulating light from the light source based on image data, and the controller provides light commands to the light source and loads image data into the array of light modulators. The catadioptric system includes a refraction unit and a reflection unit positioned in the light path of the light source between the refraction unit and the display plane. The refraction unit bends light received along a first path to a second path and the reflection unit reflects light back through the refraction unit along a third path.

An advantage of an embodiment is that the catadioptric system may be used in a wide variety of projection display system configurations, enabling a thinner and shorter display system cabinet. The wide range of applicable configurations may help to accelerate the acceptance and use of the catadioptric system.

A further advantage of an embodiment is the combination refractive and reflective operation of the catadioptric system may reduce the component count in the projection display system. This may reduce the cost of the projection display system as well as increase its overall reliability.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a DMD-based projection display system. The invention may also be applied, however, to other micro-display based projection display systems, such as those utilizing deformable mirrors, transmissive and reflective liquid crystal displays, liquid crystal on silicon, and so forth. Furthermore, the embodiments may be applied to standard projection display systems, such as those using cathode ray tubes (CRT).

Figure 1:
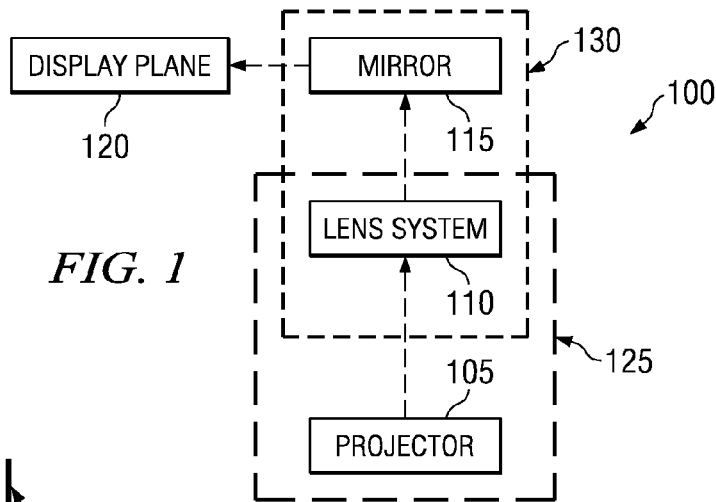
FIG. 1 is a diagram of a high-level view of a projection display system.

With reference now to FIG. 1, there is shown a high-level block diagram of a projection display system 100. The projection display system 100 includes a projector 105 that may be responsible for creating projections of images being displayed, using a light source and a light modulator, for example. The projection display system 100 also includes a lens system 110 responsible for processing and manipulation of the projections produced by the projector 105. The lens system 110 may include integrators to create a more uniform light, lenses to focus the projections, collect light to improve brightness, and so on. A mirror 115 may be present to redirect light provided by the lens system 110 onto a display plane 120, where the projections of images can be viewed. The mirror 115 may be used to decrease the overall size of the projection display system 100 by decreasing the physical distance traveled by the projections while maintaining the optical distance traveled.

In certain designs, the projector 105 and portions of the lens system 110 may be combined in a unit referred to as a projection system 125, for example, the projector 105 and a projection lens of the lens system 110. Other portions of the lens system 110 and the mirror 115 may be combined into a light direction unit 130 responsible for redirecting the projections produced by the projection system 125.

Figure 2:
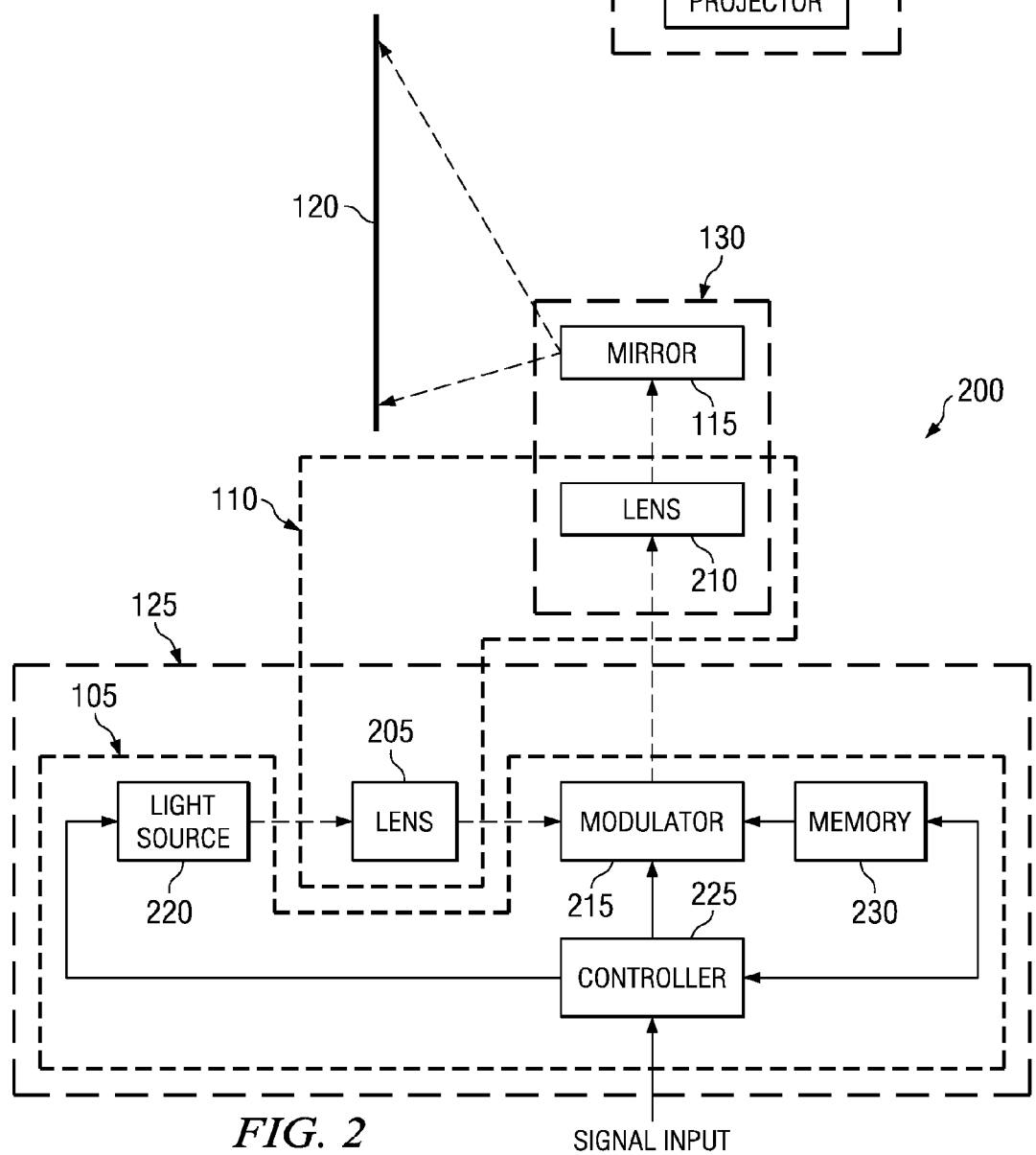
FIG. 2 is a diagram of a detailed view of an exemplary projection display system.

With reference now to FIG. 2, there is shown a diagram illustrating a detailed view of an exemplary projection display system 200. The projection display system 200 includes a projector 105, a lens system 110, a mirror 115, and a display plane 120. The projector 105 and a portion of the lens system 110, such as lens 205, make up a projection system 125, while the mirror 115 and a portion of the lens system 110, such as lens 210, make up a light direction unit 130. The lens 205 may include integrators, collimators, and so forth to help produce uniform light, while the lens 210 may include focusing lenses and so on to help focus light to produce quality images on the display plane 120.

The projector 105 may be responsible for producing projections of images provided by a signal input and may include a spatial light modulator ('modulator') 215. Preferably, the modulator 215 can be a digital micromirror device (DMD). However, the modulator 215 can also be a reflective or transmissive LCD panel, a liquid crystal on silicon (LCOS) panel, and so forth. The modulator 215, depending on image data, modulates light from a light source 220, after the light has been optically processed by the lens system 110, onto a display plane 120 of the projection display system 200. The lens system 110 and the mirror 115 help to direct the light modulated by the modulator 215 to the display plane 120. Depending on the projection display system 200, the combination of the lens system 110, such as the lens 210, and the mirror 115 may be a single unit, multiple units combined into a single unit, multiple separate units, or combinations thereof. A combination of the lens system 110 and the mirror 115 may form a catadioptric system, which is generally a system that makes use of both reflection and refraction to achieve its focal power.

A DMD contains a large number of positional micromirrors, with each micromirror's position (mirror state) being dependent upon image data corresponding to that micromirror. Depending on the image data, a micromirror will typically be in one of two states, a first position reflecting light from a light source 220 onto the display plane 120 of the projection display system 200 and a second position reflecting light away from the display plane 120. The light displayed on the display plane 120 due to the operation of the micromirrors in the modulator 215 is integrated over time by a user's eyes into images.

A controller 225 may be responsible for the operation of both the light source 220 and the modulator 215. The controller 225 may issue light commands to the light source 220 to have the light source 220 produce light of the appropriate color, intensity, duration, and so forth, to illuminate the modulator 215. The controller 225 may also issue mirror commands to the pixels of the modulator 215. Furthermore, the controller 225 may control the loading of the image data into the modulator 215, which is used to set the state of each pixel in the image. The projection display system 200 may include other components, such as a memory 230 for storing image data, color sequences, conversion values, and so on.

Figure 3A:
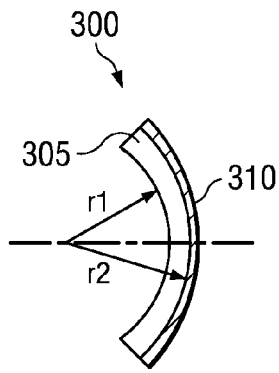
FIGS. 3a through 3f are diagrams of cross-sectional views of catadioptric systems.
Figure 3B:
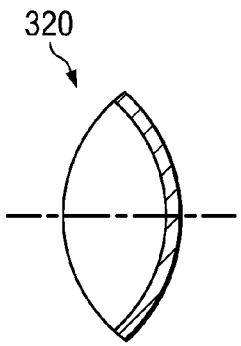
Figure 3C:
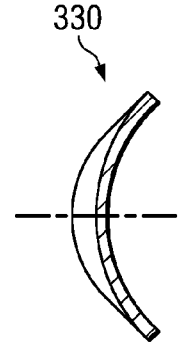
Figure 3D:
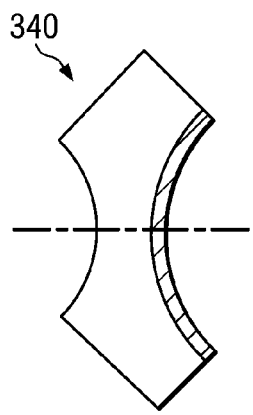
Figure 3E:
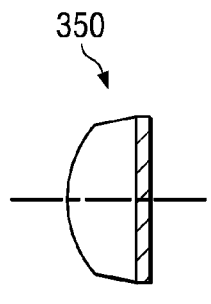

With reference now to FIGS. 3a through 3f, there are shown diagrams illustrating cross-sectional views of a catadioptric system. Examples of catadioptric systems may include powered mirrors and Mangin mirrors. A catadioptric system comprises a reflective element (a mirror portion, for example) and a refractive element (a lens portion, for example). The diagram shown in FIG. 3a illustrates an exemplary catadioptric system 300. The catadioptric system 300 includes a lens 305 and a mirror 310. As shown in FIG. 3a, the catadioptric system may be referred to as a lensed mirror. The lens 305 may have a different curvature on each of its two surfaces. A first surface may have a curvature 'r1' and a second surface may have a curvature 'r2.' However, the curvature of either surface may or may not be constant, i.e., either surface may be aspheric or flat or some other profile. Furthermore, the shapes of the lens 305 and the mirror 310 may be different.

A typical technique used to design a catadioptric system is to specify a curvature of one surface, for example, the first surface, and then compute the necessary curvature of the other surface, for example, the second surface, to correct for spherical aberration. The catadioptric system may, however, be formed from separate reflective and refractive units. Used in combination, they operate in a manner similar to the lens 305 and the mirror 310 shown.

As shown in FIG. 3a, the first surface of the lens 305 is concave in shape and the second surface of the lens 305 is concave in shape. The curvature of the first surface of the lens 305 may be more extreme in a horizontal direction than the curvature in a vertical direction. This may result in the lensed mirror 300 having the appearance of a toroid. Although shown in FIG. 3a as having surfaces with a relatively small radius of curvature, the lens 305 and the mirror 310 may have considerable curvature. In practice, a lensed mirror may have surfaces with large radii of curvature, therefore, the surfaces may appear to be flat and have the same shapes. However, under close examination, the difference in each surface's radius of curvature may become evident. The diagrams shown in FIGS. 3a through 3f should therefore not be construed as being limiting to either the spirit or the scope of the present invention.

The presence of the lens 305 in contact with the mirror 310 may effectively increase the power of the mirror 310. Light rays hitting the bottom of the mirror 310 may be bent more than light rays hitting at the top of the mirror 310. Light rays that leave the lensed mirror 300 after reflecting off the mirror 310 may undergo a second divergence. Since the reflection is done with the light rays remaining in the optically dense medium (the lens 305), the angles are less than they were prior to refraction. This may result in less transverse displacement of light rays bouncing off a back side of the display system and can reduce the overall height of the projection system. Even when the degrees of curvature are small, redirection of the light rays can be effective.

Other lens curvature configurations may be possible. The lens 305 may be manufactured from a transparent medium, such as a plastic (e.g., polymethylmethacrylate (PMMA)) or glass. The lens 305 may be molded or machined. The mirror 310 may be created by coating a second surface of the lens 305 with a reflective material. The first surface of the lens 305 may be coated with an antireflective coating to help reduce image artifacts.

Alternatively, the lens 305 and the mirror 310 may be created separately and then glued together into a single unit with a glue with an index of refraction that is similar to the material used to create the lens 305. In another embodiment, the lens 305 and the mirror 310 may be kept as separate units with a fluid placed in between the lens 305 and the mirror 310. The fluid preferably should have an index of refraction that is similar to the material used to create the lens 305. Furthermore, the lens 305 may comprise multiple lenses, with the lenses potentially being separate or combined into a single unit.

Figure 3F:
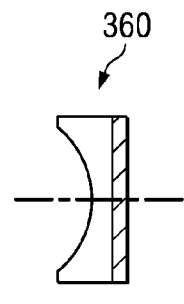

The diagrams shown in FIGS. 3b through 3f illustrate alternative configurations for the lensed mirror. A lensed mirror 320 may have a lens with a convex surface and a mirror with a concave surface (FIG. 3b), a lensed mirror 330 may have a lens with a convex surface and a mirror with a convex surface (FIG. 3c), a lensed mirror 340 may have a lens with a concave surface and a mirror with a convex surface (FIG. 3d), a lensed mirror 350 may have a lens with a convex surface and a mirror with a flat surface (FIG. 3e), and a lensed mirror 360 may have a lens with a concave surface and a mirror with a flat surface (FIG. 3f).

Figure 4A:
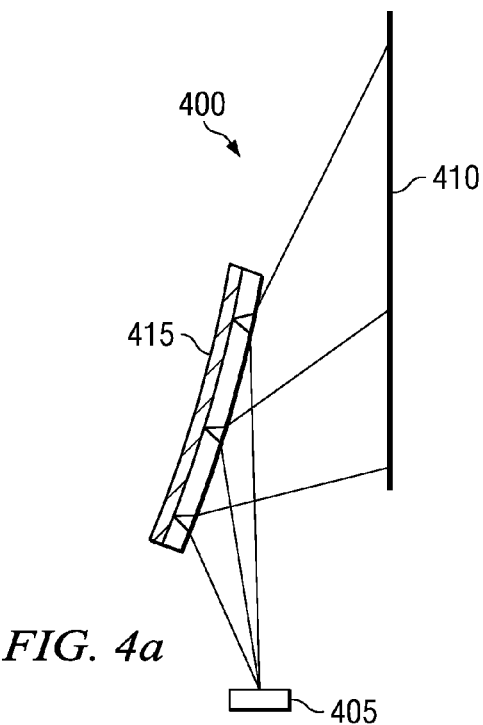
FIGS. 4a through 4c are diagrams of exemplary projection display systems.
Figure 4B:
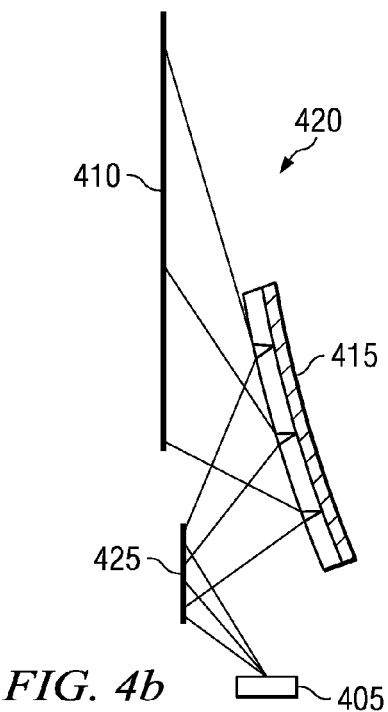
Figure 4C:
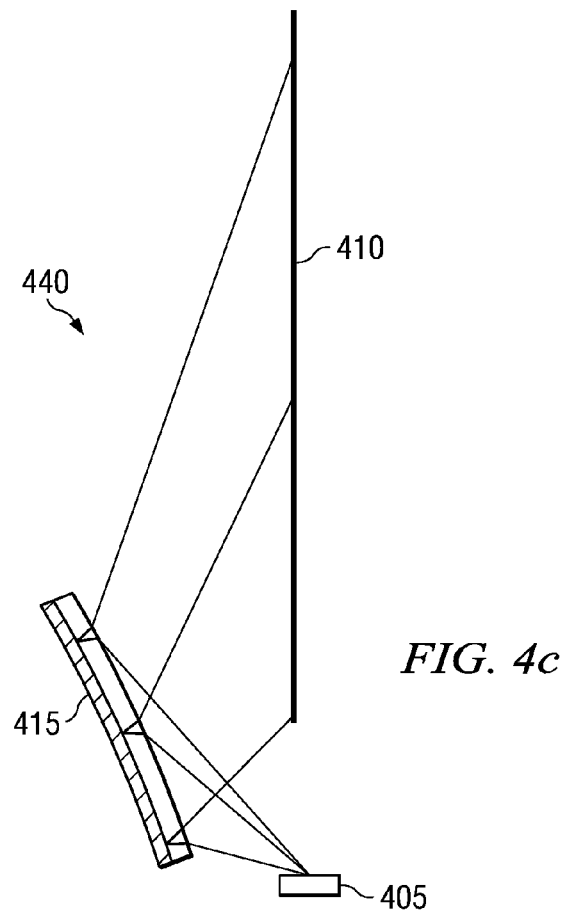

With reference now to FIGS. 4a through 4c, there are shown diagrams illustrating exemplary projection display systems, wherein a lensed mirror is used in the displaying of images. The diagram shown in FIG. 4a illustrates a projection display system 400 that includes a projector 405, a display plane 410, and a lensed mirror 415. The projection display system 400 may be arranged in a simple single fold mirror configuration with the lensed mirror 415 functioning as the single fold mirror. The diagram shown in FIG. 4b illustrates a projection display system 420. The projection display system 420 includes the lensed mirror 415 and a second mirror 425 arranged in a dual-mirror configuration. As shown, light from the projector 405 first reflects off the second mirror 425 before it reflects off the lensed mirror 415 onto the display plane 410. An alternative configuration exists where the light first reflects off the lensed mirror 415 and then the second mirror 425 before arriving at the display plane 410. The diagram shown in FIG. 4c illustrates another embodiment of a projection display system 440 with the lensed mirror 415 functioning as a single mirror.

In addition to a lensed mirror being positioned between an array of light modulators in the projector 405 and the display plane 410, a projection display system may also have a lensed mirror in the projector 405, located between a light source of the projector 405 and the array of light modulators of the projector 405. The lensed mirror in the projector 405 may help reduce the number of optical elements in the projector 405, thereby potentially reducing the projector's complexity and cost.

Figure 5:
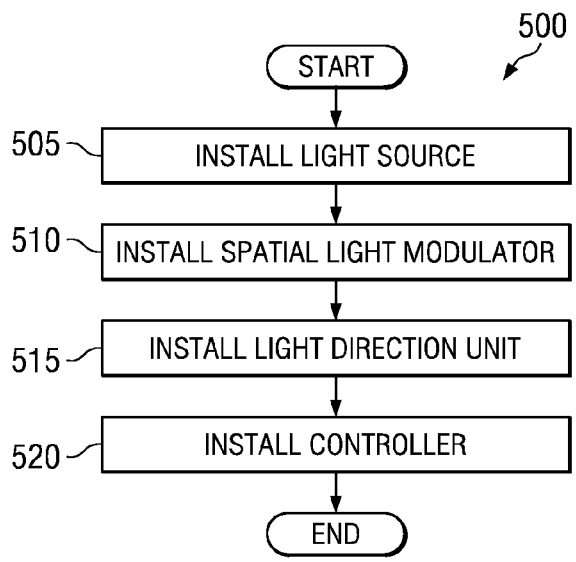
FIG. 5 is a flow diagram of a sequence of events in the fabrication of a projection system.

With reference now to FIG. 5, there is shown a diagram illustrating a sequence of events 500 in the manufacture of a projection display system. The manufacture of the projection display system may begin with installing a light source (block 505). The light source may produce multiple colors of light. The installing of the light source can be followed with installing a spatial light modulator, such as a DMD, in the light path of the multiple colors of light produced by the light source (block 510). After installing the spatial light modulator, a light direction unit may be installed in the light path of the multiple colors of light after the spatial light modulator and/or between the light source and the spatial light modulator (block 515). The light direction unit may contain a lensed mirror. A controller for the projection display system may then be installed (block 520). Alternatively, the order of these steps may be varied.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A display system comprising:

a light source to produce multiple colors of light;

an array of light modulators optically coupled to the light source and positioned in a light path of the light source, the array of light modulators configured to produce images on a display plane by modulating light from the light source based on image data;

a lensed mirror optically coupled to the array of light modulators and positioned in the light path of the light source between the array of spatial light modulators and a display plane, the lensed mirror configured to reflect modulated light from the array of light modulators onto the display plane, the lensed mirror comprising a refractive portion and a reflective portion; and a controller electronically coupled to the array of light modulators and to the light source, the controller configured to provide light commands to the light source and load image data into the array of light modulators.

2. The display system of claim 1, wherein the refractive portion of the lensed mirror comprises a lens with a first surface with a first curvature and a second surface with a second curvature.

3. The display system of claim 2, wherein the reflective portion of the lensed mirror comprises a reflective coating applied onto the second surface of the refractive portion.

4. The display system of claim 2, wherein the lens comprises glass or plastic.

5. The display system of claim 2, wherein the curvature of the first surface and the curvature of the second surface varies are not constant.

6. The display system of claim 2, wherein the lensed mirror is a Mangin mirror.

7. The display system of claim 1, wherein the refractive portion of the lensed mirror comprises a lens and the reflective portion of the lensed mirror comprises a mirror, and wherein the lens is glued to the mirror.

8. The display system of claim 1, wherein the refractive portion of the lensed mirror comprises a lens and the reflective portion of the lensed mirror comprises a mirror, and wherein the lens is coupled to the mirror with a fluid medium.

9. The display system of claim 1, further comprising a fold mirror optically coupled to the array of light modulators and positioned in the light path of the light source between the array of spatial light modulators and a display plane, the fold mirror configured to bend the light path to reduce a physical span of the light path.

10. The display system of claim 1, wherein the array of light modulators is a spatial light modulator.

11. The display system of claim 10, wherein the spatial light modulator is a digital micromirror device.

12. The display system of claim 1, wherein the lensed mirror has a convex refractive face.

13. The display system of claim 1, wherein the lensed mirror has a convex reflective face.

14. The display system of claim 1, wherein the lensed mirror has a convex reflective face and a convex refractive face.

15. The display system of claim 1, wherein the lensed mirror has a convex reflective face and a convex refractive face and wherein a radius of curvature of the reflective face is greater than a radius of curvature of the refractive face.

16. The display system of claim 1, wherein the lensed mirror has a convex reflective face and a concave refractive face.

17. A display system comprising:

a light source to produce multiple colors of light;

an array of light modulators optically coupled to the light source and positioned in a light path of the light source, the array of light modulators configured to produce images on a display plane by modulating light from the light source based on image data;

a lensed mirror optically coupled to the array of light modulators and positioned in the light path of the light source between the array of spatial light modulators and a display plane, the lensed mirror configured to reflect modulated light from the array of light modulators onto the display plane, the lensed mirror comprising a refractive portion and a reflective portion;

a controller electronically coupled to the array of light modulators and to the light source, the controller configured to provide light commands to the light source and load image data into the array of light modulators; and a second lensed mirror optically coupled to the light source and positioned in the light path of the light source between the light source and the array of spatial light modulators, the second lensed mirror configured to reflect light from the light source onto the array of light modulators.

\* \* \* \* \*